(12) United States Patent
Hinnen et al.

(10) Patent No.: US 8,831,771 B2
(45) Date of Patent: Sep. 9, 2014

(54) DUAL TEMPERATURE AUTOMATED STORAGE AND RETRIEVAL SYSTEM

(75) Inventors: Ben Hinnen, Arvada, CO (US); Roberto Vecchi, Spilamberto (FR); Terry Farnsworth, Aurora, CO (US)

(73) Assignee: Translogic Corporation, Denver, CO (US)

( * ) Notice: Subject to any disclaimer, the term of this patent is extended or adjusted under 35 U.S.C. 154(b) by 1007 days.

(21) Appl. No.: 12/630,680

(22) Filed: Dec. 3, 2009

(65) Prior Publication Data

US 2010/0310344 A1  Dec. 9, 2010

Related U.S. Application Data

(60) Provisional application No. 61/119,539, filed on Dec. 3, 2008.

(51) Int. Cl.
  *G06F 7/00* (2006.01)
  *G06Q 10/08* (2012.01)
  *F25D 25/04* (2006.01)

(52) U.S. Cl.
  CPC .............. *G06Q 10/087* (2013.01); *F25D 25/04* (2013.01)
  USPC ....................................................... 700/214

(58) Field of Classification Search
  USPC ................................. 700/214, 221
  See application file for complete search history.

(56) References Cited

U.S. PATENT DOCUMENTS

| | | | |
|---|---|---|---|
| 3,397,817 A | 8/1968 | Smith | |
| 3,786,910 A | 1/1974 | Wallis | |
| 3,972,412 A | 8/1976 | Henkel | |
| 4,349,714 A | 9/1982 | Tamano | |
| 4,398,651 A | 8/1983 | Kumpfer | |
| 4,687,119 A | 8/1987 | Juillet | |
| 4,762,250 A | 8/1988 | Friberg | |
| 5,105,979 A | 4/1992 | Bakx et al. | |
| 5,205,128 A | 4/1993 | Richard | |
| 5,240,139 A | 8/1993 | Chirnomas | |
| 5,245,150 A | 9/1993 | Grandi | |
| 5,642,767 A | 7/1997 | Nair | |
| 6,179,162 B1 | 1/2001 | Motsenbocker | |
| 6,498,329 B1 | 12/2002 | Gibernau | |
| 7,651,310 B2 | 1/2010 | Gambarelli et al. | |
| 2002/0177922 A1 | 11/2002 | Bloom | |
| 2005/0002762 A1 | 1/2005 | Gambarelli et al. | |

(Continued)

FOREIGN PATENT DOCUMENTS

WO  2003073018 A1  9/2003

OTHER PUBLICATIONS

GWEN VOLPE RPh, An Introduction to PillPick, White Paper, Swisslog Healthcare Solutions, May 1, 2006,7 Pages.

(Continued)

*Primary Examiner* — Ramya Burgess

(74) *Attorney, Agent, or Firm* — Russell T. Manning; Marsch Fischmann & Breyfogle LLP

(57) ABSTRACT

An automated storage and retrieval system is presented. The automated storage and retrieval system may have at least two zones that are thermally isolated. The automated storage and retrieval system is operative to store and retrieve items from a plurality of storage locations in the first and second zone. An access member may be provided to selectively maintain and interrupt thermal isolation of the zones.

17 Claims, 11 Drawing Sheets

(56) References Cited

U.S. PATENT DOCUMENTS

| | | | |
|---|---|---|---|
| 2005/0169731 A1 | 8/2005 | Davolio et al. | |
| 2006/0191914 A1 | 8/2006 | Guindulain Vidondo | |
| 2006/0228203 A1 | 10/2006 | Baumle et al. | |
| 2007/0270999 A1 | 11/2007 | Chirnomas | |
| 2008/0051929 A1* | 2/2008 | Hongkham et al. | 700/214 |
| 2008/0051930 A1* | 2/2008 | Oh et al. | 700/214 |
| 2010/0058950 A1 | 3/2010 | Aschauer et al. | |
| 2010/0068022 A1 | 3/2010 | Aschauer et al. | |
| 2012/0283867 A1* | 11/2012 | Gelbman et al. | 700/215 |

OTHER PUBLICATIONS

BoxPicker, Automated Drug Management System, Pharmacy Store and Pick System, Brochure, Swisslog Healthcare Solutions, Jan. 13, 2007, 2 Pages.

DrugNest, Automated Drug Management System, Storage, Swisslog Healthcare Solutions, Brochure, Jan. 13, 2007, 2 Pages.

Pharmacy Automated Systems, Swisslog Healthcare Solutions, webpage, Jan. 13, 2007, 2 Pages.

* cited by examiner

DUAL TEMPERATURE AUTOMATED STORAGE AND RETRIEVAL SYSTEM

RELATED APPLICATIONS

This application claims priority to U.S. Provisional Application Ser. No. 61/119,539, filed Dec. 3, 2008, entitled "DUAL TEMPERATURE AUTOMATED STORAGE AND RETRIEVAL SYSTEM," the entirety of which is hereby incorporated by reference.

FIELD OF THE INVENTION

The present invention relates to automated storage and retrieval systems, and is particularly apt for pharmacy and other medical-related implementations.

BACKGROUND OF THE INVENTION

Automated storage and retrieval systems have been employed in a wide variety of applications, including pharmacy applications. In this regard, the automated storage and retrieval of perishable, or time-sensitive, items yields numerous advantages, including enhanced inventory management and user efficiencies. Given the nature of many medicaments, such advantages are of particular importance in pharmacy applications.

In conjunction with the realization of these advantages, it is also desirable to maintain or reduce the space requirements for such systems, while increasing the functionality thereof. In the later regard, the present inventors have recognized that enhanced functionality may be realized by enlarging the scope of medications, pharmaceutical supplies and/or other medical-related materials that may be selectively stored and retrieved in an automated system.

SUMMARY OF THE INVENTION

In view of the foregoing, a primary objective of the present invention is the provision of an automated storage and retrieval system that facilitates the automated storage and retrieval of an enlarged scope of item types (e.g. items having different storage condition needs), and that is particularly apt for pharmaceutical and other medical-related applications. More particularly, the present inventors have recognized the desirability of providing an automated storage and retrieval system that may be employed in conjunction with the storage of pharmaceutical and/or other medical-related items having different storage temperature requirements.

In one aspect, an inventive automated storage and retrieval system comprises an enclosed area including at least a first zone having a first plurality of storage locations and a second zone having a second plurality of storage locations, wherein at least one of the zones is substantially thermally isolated from other zone(s). Further, the inventive system may include an automated transport member operable to selectively transport an item between one of the first plurality or second plurality of storage locations, and at least one predetermined area within the enclosed area. In the later regard, the predetermined area may comprise an access port for accessing items from outside of the enclosed area.

In one embodiment, the system may further comprise a thermal control unit operable to maintain one of the zones at a predetermined and selectable temperature different than the temperature of one or more other zone(s) within the enclosed area. By way of example, the thermal control unit may be operable to maintain one of the zones at a lower temperature (e.g. relative to other zones) appropriate for storage of certain medications and/or other medical-related materials. The thermal control unit may also be operable to establish and maintain different temperatures in one of the zones at different times.

In certain implementations the system may also include an access member located between two adjacent zones. The access member may be operable to provide the automated transport member with selective access from a first zone in to and out of a second zone. For example, the access member may be controllable to selectively locate an aperture between a first zone and a temperature-controlled second zone, wherein an automated transport member located in the first zone may selectively enter into and out of the second zone to remove an item from within the second zone through the aperture.

In one embodiment, the system may also include a controller operable to receive user input commands, wherein the controller may be operable to correspond, or correlate, a user input command with a specified stored item and determine a location within the system corresponding with the user-specified item. The controller may also be operable to (i) control the automated transport member such that the automated transport member may be positioned adjacent to the determined location, (ii) control the access member to locate an aperture thereof adjacent to the determined location, (iii) control the automated transport member to retrieve the user-specified item from the determined location, and (iv) control the automated transport member to transport the user-specified item from the determined location to an access port within the enclosed area.

Another embodiment may include a method of retrieving an item from an automated storage and retrieval system. The method may include locating an automated transfer member in a first zone adjacent to a storage location in a second zone. The first zone and the second zone may be thermally isolated. The method may also include disrupting the thermal isolation between the first zone and the second zone adjacent to the storage location and communicating the automated transfer member from the first zone at least partially into the second zone. Further, the method may include removing from the storage location an item, returning the automated transfer member to the first zone, and restoring thermal isolation between the first zone and the second zone. The method may also include depositing the item retrieved into an access port.

Another embodiment includes a method of storing an item in an automated storage and retrieval system. The method may comprise retrieving an item from an access port with an automated transport member. Also, the method may include locating the automated transport member in a first zone adjacent to a storage location in a second zone. The first zone and said second zone may be thermally isolated. Further, the method may include interrupting the thermal isolation between the first zone and the second zone adjacent to the storage location, communicating the automated transport member from the first zone at least partially into the second zone, and depositing the item into the storage location. The method may also include returning the automated transport member to the first zone and restoring thermal isolation between the first zone and the second zone.

Further features and corresponding advantages of the present invention will be apparent to those skilled in the art upon consideration of the further description that follows.

DETAILED DESCRIPTION

Figure 1A:
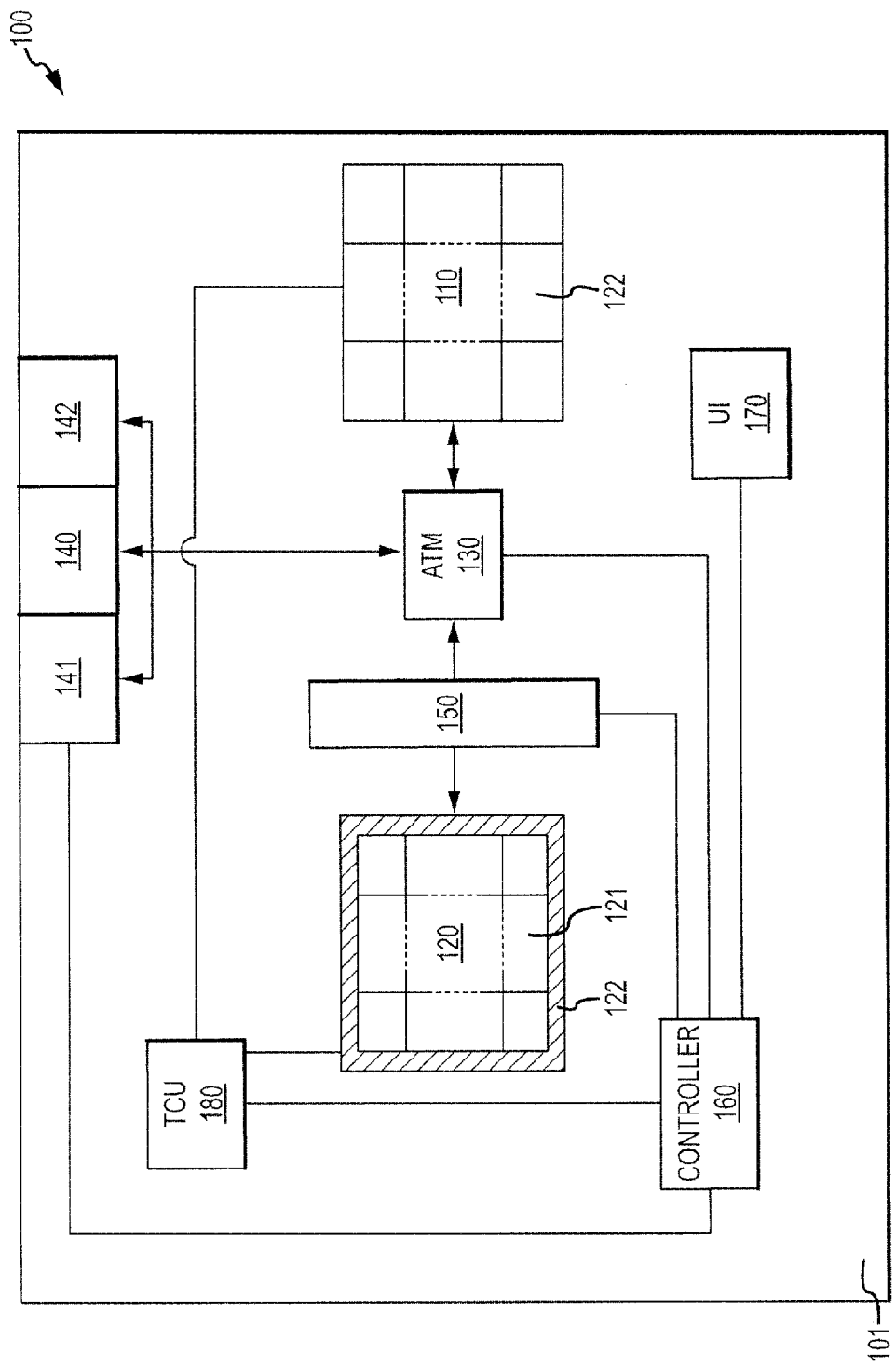
FIGS. 1A and 1B are schematic illustration of one embodiment of an automated storage and retrieval system.
Figure 1B:
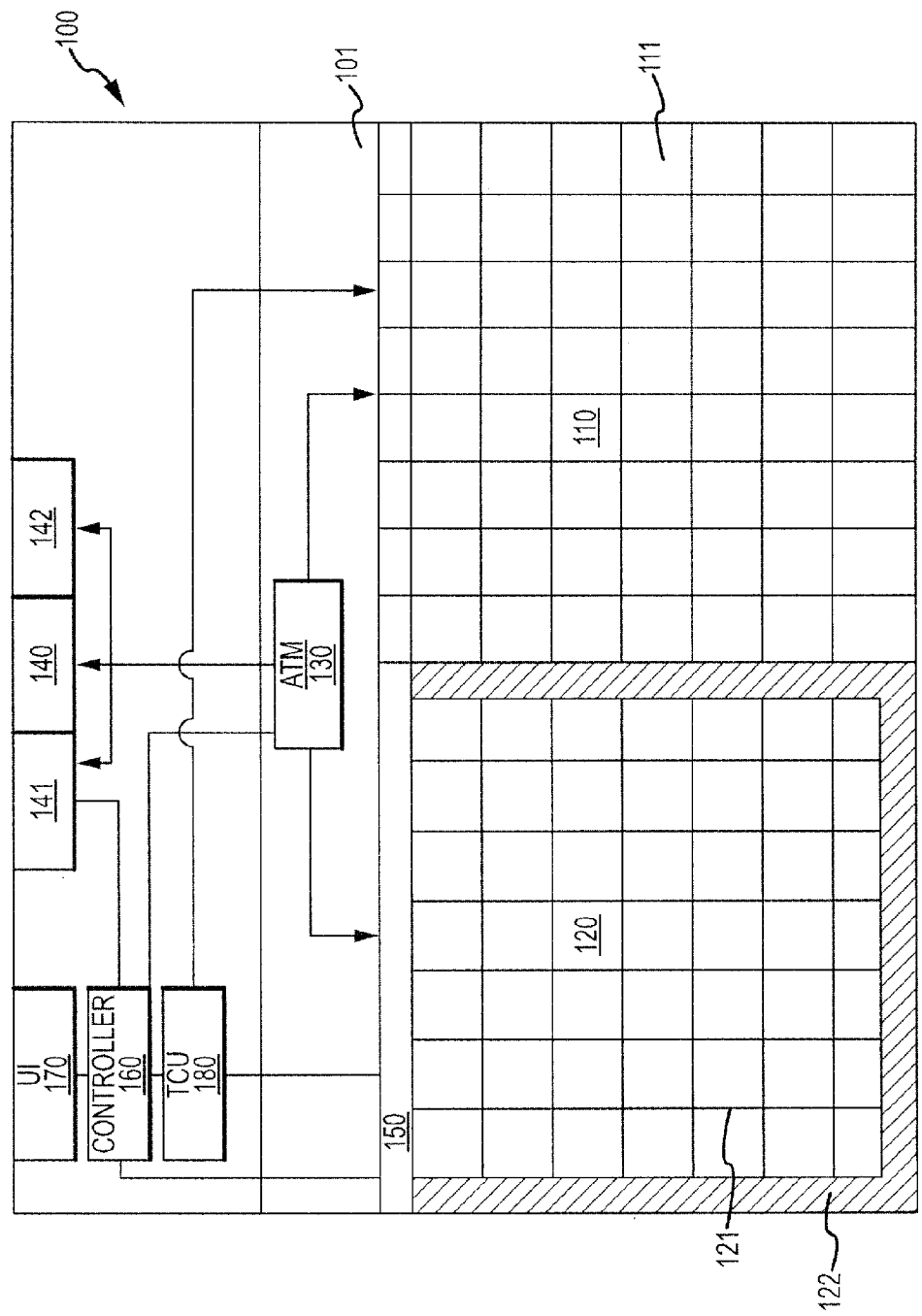

FIGS. 1A and 1B are schematic illustrations of one embodiment of an automated storage and retrieval system 100. FIGS. 1A and 1B are not to scale and depict the general components and operative relationships between the general components of the embodiment. The automated storage and retrieval system 100 generally may include an enclosed area 101 that defines a boundary between the automated storage and retrieval system 100 and an exterior environment (e.g. a cube-shaped enclosure located within a hospital pharmacy).

The enclosed area 101 may contain a first zone 110 and a second zone 120. The first zone 110 may contain a first plurality of storage locations 111 (e.g. arranged in rows and/or columns). The second zone 120 may contain a second plurality of storage locations 121 (e.g. arranged in rows and/or columns). The second zone 120 may be thermally isolated from the first zone 110 such that disparate temperatures may be established in each of the first zone 110 and the second zone 120. The maintenance of offset temperatures in the first zone 110 and the second zone 120 may be at least partially facilitated by insulation 122 substantially surrounding the second zone 120, or similar means of maintaining thermal isolation known. Accordingly, the second zone 120 may be maintained at a temperature different from the first zone 110.

In one implementation, the temperature of the first zone 110 may be the ambient temperature of the environment in which the automated storage and retrieval system 100 is located. Additionally, the second zone 120 may be maintained at a specified temperature. In one embodiment, the temperature of the first zone 110 is not maintained, while the second zone 120 is maintained at a temperature offset from the temperature in the first zone 110. In another embodiment, this offset in temperatures of the first zone 110 and the second zone 120 is such that the temperature in the second zone 120 is lower than the temperature in the first zone 110. In this regard, the offset temperatures of the first zone 110 and the second zone 120 may enable the automated storage and retrieval system 100 to store both items at room temperature as well as items that require storage at a temperature offset from the temperature within the first zone 110 using a single unit.

The automated storage and retrieval system 100 may also include an automated transport member (ATM) 130. The automated transport member 130 of the present embodiment may be robotically or otherwise controllably automated to transport items within the enclosed area 101. By way of example, such items may include medical-related materials and/or storage containers, or bins, utilized to hold medications and/or other medical-related items. These items may be transported between the first zone 110 and an access port 140. Similarly, the automated transport member 130 may transport items between the second zone 120 and the access port 140. When accessing items or storing items in the second zone 120, the automated transport member 130 may gain access to the second zone 120, which may be thermally isolated from the first zone 110. As such, the automated transport member 130 may at least partially pass through or otherwise operatively engage with an access member 150 disposed at an interface between the first zone 110 and the second zone 120. The access member 150 may be disposed at this interface between the first zone 110 and the second zone 120 such that when the automated transport member 130 is not accessing the second zone 120, the access member 150 is controlled to ensure that the thermal isolation of the second zone 120 is maintained.

The access port 140 may allow items to be communicated between the exterior of the enclosed area 101 and the interior of the enclosed area 101. As such, the access port 140 may have an opening that allows a user, device, or other means, to place, deposit, or otherwise communicate an item designated for storage in the automated storage and retrieval system 100 within the access port 140. The access port 140 may functionally communicate with the automated transport member 130 such that an item that is within in the access port 140 may be transported by the automated transport member to either the first zone 110 or the second zone 120. Similarly, items retrieved by the automated transport member 130 from the first zone 110 or the second zone 120 may be communicated to the access port 140 such that a user, device, or other means, may retrieve the item from the access port 140 and remove the item from the enclosed area 101. In one implementation, the access port 140 may include an exterior side that is selectively openable/closeable by a user and an interior side that is accessible for by the automated transport member 130.

In some implementations, a plurality of access ports 140, 141, 142 may be provided. Each access port 140, 141, 142 may be capable of containing items to be stored (e.g. as deposited by user(s)) or items that have been retrieved (e.g. for removal by a user(s)). Accordingly, the efficiency of the automated storage and retrieval unit 100 may be increased as the automated transport member 130 may carry out multiple tasks (e.g. either retrieving or storing) such that a plurality of items may be retrieved or stored without the need to sequentially place into and retrieve from a single access port 140. That is, the automated transport member 130 may store or retrieve a plurality of items from multiple access ports 140, 141 or 142.

An embodiment of the automated storage and retrieval system 100 may further include a controller 160. The controller 160, in one embodiment, may be a microprocessor or the like and may further incorporate hardware, software, firmware, or a combination thereof. Further the controller 160 may include other components such as an I/O board, input devices, output devices, and the like. This controller 160, while being depicted in FIG. 1 as within the enclosed area 101, may be placed within the enclosed area 101 or exterior to the enclosed area 101. The location of the controller 160 is not crucial to the operation of the automated storage and retrieval system 100, such that the controller 160 may be located in any location provided that operative communication between the controller 160 and the automated storage retrieval system 100 and its components may be maintained. The controller 160 in one embodiment of the automated storage and retrieval system 100 may be in electronic communication with, inter alia, the automated transport member 130, the access port 140, the access member 150, a user interface 170, and a thermal control unit 180.

The controller 160 may control, among other functions, the location and operation of the automated transport member 130 within the enclosed area 101. This may entail the controller 160 controlling motors, actuators, or other means for effectuating motion of the automated transport member within the enclosed area 101. The controller 160 may further control the operation of the automated transport member 130 via motors, actuators, or other means to effectuate deposit and retrieval of items to and from any one of the first plurality of storage locations 111 in the first zone 110, the second plurality of storage locations 121 in the second zone 120, and any of the access ports 140, 141 or 142.

In addition to control of the automated transport member 130, the controller 160 may be operative to control the access member 150. This may include, among other controlled functions, the controller 160 controlling the access member 150 to allow temporary communication between one or more of the second plurality of storage locations 121 and the automated transport member 130. The control of the access member 150 may include controlling the access member 150 in conjunction with the automated transport member 130 such that the access member 150 is controlled to allow access to the automated transport member 130 after the automated transport member 130 has been positioned adjacent to the second zone 120. Alternatively, the controller 160 may simultaneously control the automated transport member 130 and the access member 150 such that the access member 150 is controlled to provide access to at least one of the second plurality of storage locations 121 while the automated transport member 130 is being controlled by the controller 160 such that the automated transport member 130 is moved adjacent to the at least one of the second plurality of storage locations 121 to which access is being facilitated by the access member 150. In any event, the automated transport member 130 may gain access to the second zone 120 in coordination with the access member 150. In addition, the controller may control the access member 150 to limit access to the second zone 120 to maintain thermal isolation of the second zone 120 when the automated transport member 130 is not accessing the second zone 120.

The controller 160 may further operate to control a thermal control unit 180. The thermal control unit 180 may operate to control a temperature within the first zone 110, the second zone 120, or both. Additionally, the thermal control unit 180 may maintain a temperature in the second zone 120 offset from the temperature in the first zone 110. In one embodiment the thermal control unit may maintain a temperature in the second zone 120 below the temperature in the first zone 110. While the temperature control unit 180 is depicted within the enclosed area 101, the temperature control unit 180 may be located exterior to the enclosed area 101. The first zone 110 may be in communication with the thermal control unit 180 or alternatively, the first zone 110 may simply be a temperature similar to the ambient temperature of the location of the automated storage and retrieval system 100. The thermal control unit 180 may include a refrigeration system operative to cool a zone. Alternatively, the thermal control unit 180 may include a heating system to heat a zone. Further still, the temperature control unit 180 may incorporate refrigeration functionality and/or heating capability within a single unit.

The controller 160 may also be in operative communication with a user interface 170. The user interface 170 may communicate user-entered commands to the controller 160 to at least partially control the operation of the automated storage and retrieval system 100. Examples of such an interface may include a keyboard and monitor, a touch screen, a barcode reader, a RFID reader, or any other user interface known in the art including a combination of any of such items. The user interface 170 may be operative to receive user commands related to storage and retrieval, as well as inputs that may include data about items, a user, a purchase order, or any other information necessary to at least partially facilitate control of the automated storage and retrieval unit 100.

The controller 160 may further control any one or all access ports 140, 141 or 142, such that access by a user to an access port 140, 141 or 142 may be limited. As such, a user may enter data using the user interface 170 or other means in order to gain access to one or more of the access ports 140, 141 or 142. This may be accomplished through the use of a locking device(s) or other means controlled by the controller 160 for limiting access by a user to the access ports 140, 141 or 142.

In one arrangement, one or more automated devices may be included in the system 100 for wireless scanning, or reading, of codes located on items to be stored within and/or retrieved from within the system and/or codes located on storage bins or the like utilized to contain items stored/retrieved within the system 100. By way of example, RFID scanners may be provided to read RFID tags located on medications, other medical-related materials and/or storage bins thereof. Alternatively or additionally, bar code scanners may be provided to read bar code indicia (e.g. labels) located on such items. In turn, the scanner(s) may be operatively interfaced with the user interface 170 and/or controller 160, wherein item-specific information may be provided at user interface 170 in relation to items deposited for storage and/or retrieved for removal. For example, a display at user interface 170 may indicate to a user that a given, retrieved item that is being removed is a refrigerated item and should be handled accordingly. The scanner(s) may also be employed with controller 160, as well as user interface 170, for automated tracking and verification of items stored and removed from system 100.

As noted, the automated storage and retrieval system 100 of the present embodiment may be used to store and retrieve items that require storage at a temperature different from that of other items. Employing the user interface 170, a user may enter data relating to an item stored, the user, as well as any other information required. The user may then place the item in a specified access port 140, 141, or 142. The controller 160 may control the automated transport member 130 to retrieve the item placed in the access port 140. The controller may then further control the automated transport member 130 to transport the item from the access port 140 to a position adjacent to a storage location 111 or 121 of either the first zone 110 or the second zone 120, respectively. Based at least partially on information entered by the user and/or on information received from an item code scanner, the controller 160 may further determine whether the item requires storage at a specified temperature.

Should the controller 160 determine item should be stored at an offset temperature (e.g., a temperature lower than that in the first zone 110) the controller 160 may control the automated transport member 130 and the access member 150 such that the automated transport member 130 is positioned adjacent to a specified storage location within the second zone 120 and also may control the access member 150 such that the access member 150 may provide access to the specified storage location within the second zone 120. The automated transport member 130 may then communicate the item to the specified storage location within the second zone 120. The controller may then control the access member 150 to once again limit the access to the second zone 120 such that the thermal isolation of the second zone 120 is maintained.

Items may similarly be stored in the first zone 110 in the event that the item does not require storage at a specified temperature or at an offset temperature. As such, the automated transport member 130 transporting an item retrieved from an access port 140, 141 or 142 may be positioned adjacent to a storage location 111 in the first zone 110 and communicate the item between the automated transport member 130 and the storage location 111.

The automated storage and retrieval system 100 may further be used to retrieve items that are either stored at an offset temperature in the second zone 120 or within the first zone 110. As such, a user may enter item-related data using the user interface 170. The controller 160 may then determine the location of a given item that is requested. When determining from where an item is to be retrieved, information regarding lot numbers or expiration dates of items stored in the automated storage and retrieval system 100 may be considered. The controller 160 may control the automated transport member 130 such that it is positioned adjacent to the specified location of the requested item. Again, when accessing items from the second zone 120, the automated transport member 130 may gain access to the second zone 120 through the access member 150. The controller 160 facilitates this coordination between automated transport member 130 and the access member 150 such that the automated transport member may retrieve the item from the storage location 121 in the second zone 120. The controller 160 may subsequently control the automated transport member 130 such that the automated transport member 130 may be positioned adjacent to an access port 140, 141 or 142. The requested item may then be communicated to the access port 140, 141 or 142. In one embodiment, the user may be required to enter data into the user interface 170. If the data is verified, the controller 160 may control an access-limiting device associated with the access port 140, 141 or 142 in which the item is located to allow the user to retrieve the item from the access port 140, 141 or 142.

When retrieving or storing items from the second zone 120 or any other temperature controlled zone, the zone may lose thermal isolation when the access member 150 is positioned to allow the automated transport member 130 access to the zone. As such, during retrieval and storage operations, the temperature in the temperature controlled zone may deviate from the temperature at which it is being maintained. To assist in counteracting this deviation in temperature, the controller may be operative to change the temperature in the second zone in anticipation of certain system operations. For instance, the system 100 may receive a number of successive storage or retrieval commands for items in the temperature controlled zone. Accordingly, the controller 160 may be operative to adjust the temperature in the temperature controlled zone to compensate for the anticipated operation of the system 100. This anticipatory changing of the temperature within the temperature controlled zone may be in response to a variety of events. For instance, the temperature may be changed in response to receiving a certain number of storage or retrieval requests for items stored within the temperature controlled zone. Moreover, the anticipatory changing could correspond to particular time. For instance, the system 100 may anticipatorily change the temperature at a given time (e.g., prior to morning rounds in a large hospital) during the day in anticipation of a number of retrievals or storage operations.

Figure 2:
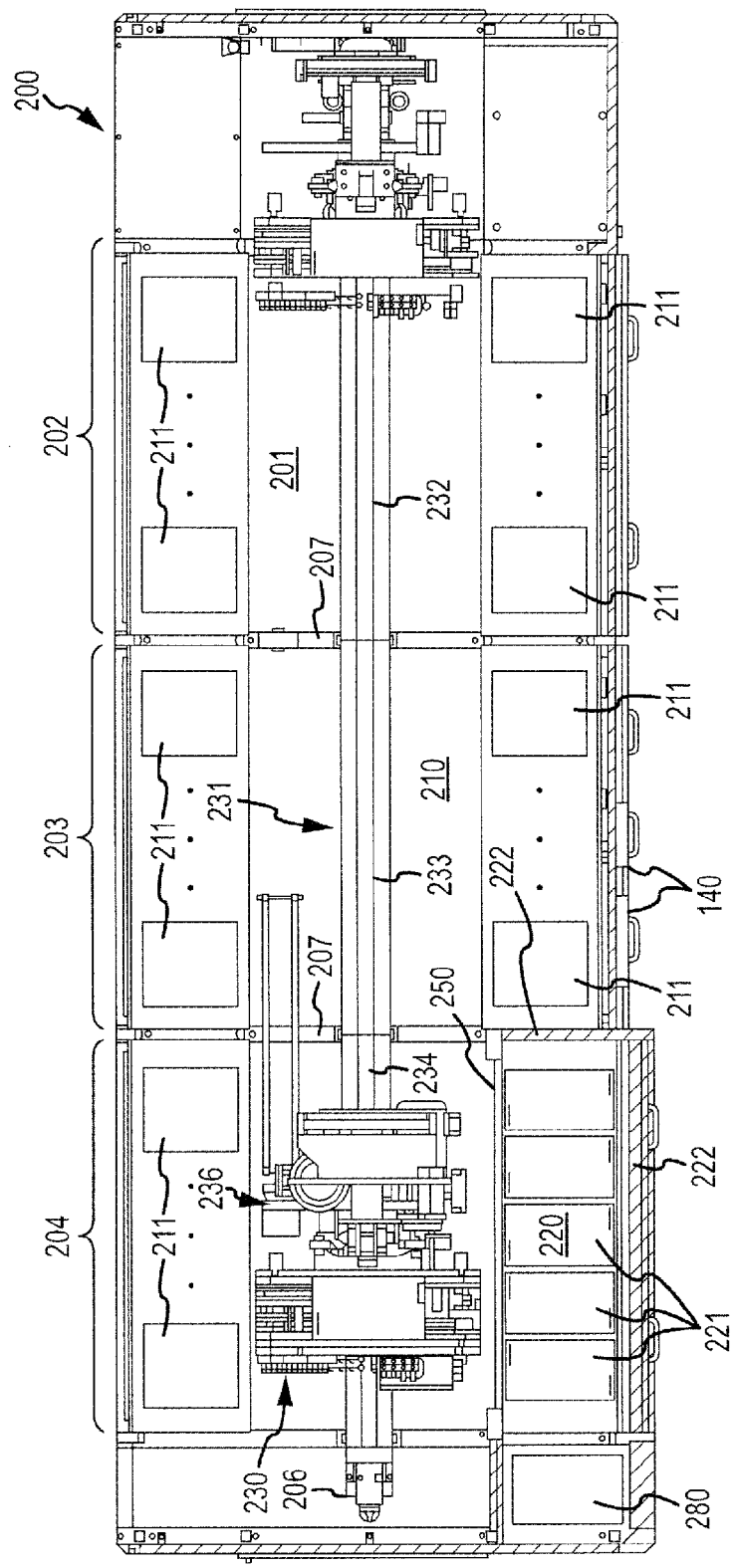
FIG. 2 shows an alternative embodiment of an automated storage and retrieval system.

FIG. 2 shows an alternative embodiment of an automated storage and retrieval system 200. The automated storage and retrieval system 200 as depicted in FIG. 2 may be composed of a first module 202, a second module 203, and a third module 204. These modules may be connected in an end-to-end fashion such that they collectively define an enclosed area 201. Within the enclosed area 201, a thermal control unit 280 (e.g. an evaporator for circulation of water with ethylenglycol) may be in operative communication with a part of the enclosed area 201 to maintain a temperature within that part of the enclosed area 201. In this manner, the enclosed area 201 may be effectively separated into at least two functional zones, at least one of which may be in operative communication with the thermal control unit 280 to maintain a temperature within that zone. For example, FIG. 2 depicts one implementation wherein a portion of the area adjacent to the thermal control unit 280 may define a second zone 220. Accordingly, the remainder of the enclosed area 201 (including the entire first module 202, the entire second module 203 and the remainder of the third module 204 not included in the area composing the second zone 220) may define the first zone 210. In the implementation as depicted, the second zone 220 may be maintained at a temperature lower than the temperature in the first zone 210. In accordance, insulation 222 or the like may substantially surround the second zone to maintain thermal isolation. The first zone 210 may contain a first plurality of storage locations 211. Also, the second zone 220 may contain a second plurality of storage locations 221. In other arrangements, a thermal control unit 280 may be disposed outside of the modules 202, 203, 204 and operatively interconnect with at least module 204 for cooling the second zone 220 (e.g. via condenser for cooling water with ethylenglycol).

Each module 202, 203, 204 depicted in FIG. 2 may be an individual unit that may be selectively positioned together in an end-to-end fashion such that the modules meet at junction(s) 207. Accordingly, the enclosed area 201 may be selectively and readily expanded by adding modules in this end-to-end fashion as will be discussed further below. This may entail expanding the first zone 210, the second zone 220, or both.

FIG. 2 also depicts an automated transport member 230. A primary support member 231 may support the automated transport member 230. The primary support member 231 may be comprised of individual support segments 232, 233, and 234. The automated transport module 230 of FIG. 2 may be capable of moving in a first direction that corresponds to the length of the primary support member 231. The automated transport member 230 may include one or more motors 235 that may be controlled by a controller (not shown) in order to provide movement of the automated transport member 230 along the length of the primary support member 231. The automated transport member 230 may be capable of traveling along the primary support member 231 such that the automated transport member 230 may be positioned adjacent to any of the storage locations 211, 221 within the modules 202, 203, 204.

Figure 3:
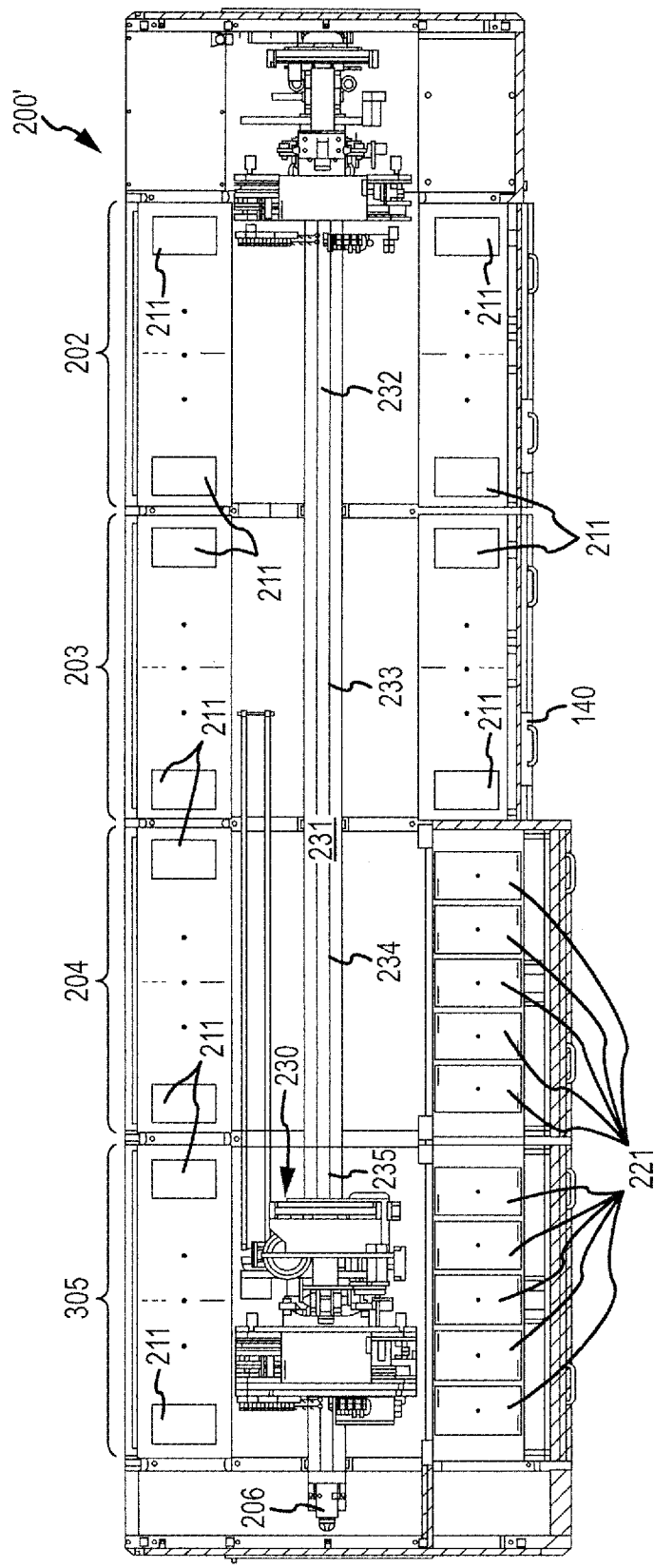
FIG. 3 shows an extended version of the automated storage and retrieval system embodiment of FIG. 2.

In accordance with the modular construction of the automated storage and retrieval system 200, the primary support member 231 may be expanded along with the enclosed area 201. An extended automated storage and retrieval system 200' is depicted in FIG. 3. A new module 305 may be added in an end-to-end fashion adjacent to the third module 204. A terminal end 206 of the primary support member 231 may be removed. The additional module 305 may be attached in an end-to-end fashion with a module on a terminal end of the automated storage and retrieval system 200. Also, an additional support segment 235 may be fitted to the primary support member 231 such that the primary support member 231 may be extended commensurately with the length of the new module 305. The terminal end 206 may then be replaced at the end of the new support segment 235 as shown in FIG. 3. The expanded automated storage and retrieval system 200' of one embodiment is shown in FIG. 3. This process may be used to extend the automated storage and retrieval system 200' such that the storage capacity of the unit may be readily expanded or reduced to respond to the needs of the user of the unit. In such an expanded automated storage and retrieval system 200', the automated transport member 230 may travel along the extent of the now lengthened primary support member 235 such that all of the storage locations 211, 221 may be accessed by the automated transport member 230.

As described and shown in FIGS. 2 and 3, the automated transport member 230 may travel in a first direction to access storage locations 211, 221 which may extend in that direction. This first dimension of travel may correspond to the length of the primary support member 231 as depicted in FIG. 2. Storage locations may extend in this direction (forming a horizontal shelf or row of storage locations). In addition to being capable of moving in a first dimension, the automated transport member 230 may also be capable of moving in a second dimension. This second dimension of movement may include the automated transport member 230 moving in a direction perpendicular to the first dimension (e.g. such that the automated transport member may be projected toward or away from the row of storage locations). Additionally, the automated transport member 230 may move in a third dimension perpendicular to both the first dimension and the second dimension. The movement of the automated transport member 230 in this third dimension may facilitate access to multiple levels of storage locations (e.g. columns of storage locations). For example, one implementation may include an automated storage and retrieval system with an automated transport member 230 capable of moving in three dimensions to access a plurality of rows and a plurality of columns of storage locations, e.g. by moving up and down, side-to-side, and in-and-out relative to the matrix of storage locations.

In one arrangement, the automated transport member 230 may include a pneumatic head, or vacuum, member for selective interface with storage bins utilized to hold stored materials at shelf locations in the system 200. That is, a vacuum member may be selectively positioned and controlled to pneumatically engage a storage bin at a given shelf location, and further controlled to move the bin from the shelf storage location onto a support surface of the automated transport member 230. Then, the automated transport member 230 may be moved along support members to a desired location. Similarly, automated transport member 230 and the vacuum member thereof may be positioned/controlled to locate a bin at a given shelf location.

In further description of FIG. 2, an access member 250 may be disposed at an interface between the first zone 210 and the second zone 220. The access member 250 may at least partially maintain the thermal isolation between the second zone 220 and the first zone 210. The access member 250 of FIG. 2 may be disposed such that the access member 250 is located between the second plurality of storage locations 221 within the second zone 210 and the automated transport member 230. The access member 230 may be controlled to allow automated transport member 230 to selectively access a given one or more of the storage locations 221.

Figure 7A:
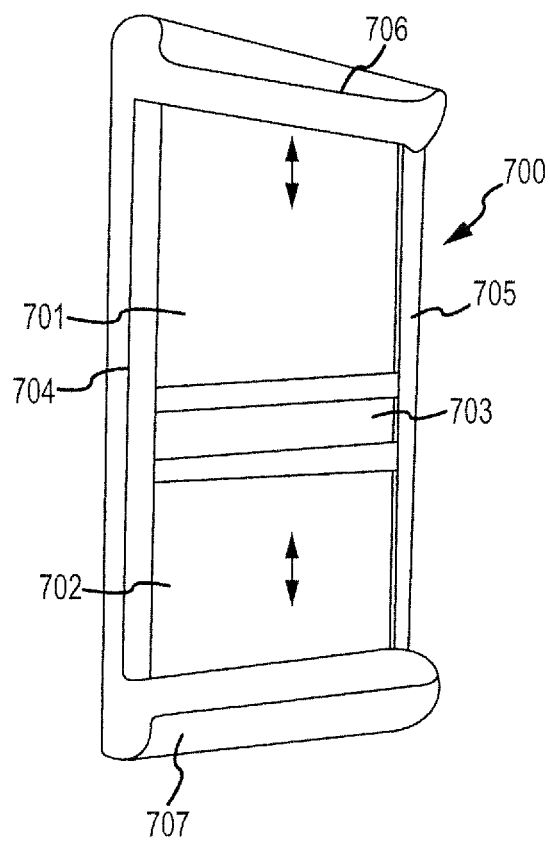
FIGS. 7A and 7B illustrate one embodiment of an access member employable in the automated storage and retrieval system embodiment of FIG. 2.
Figure 7B:
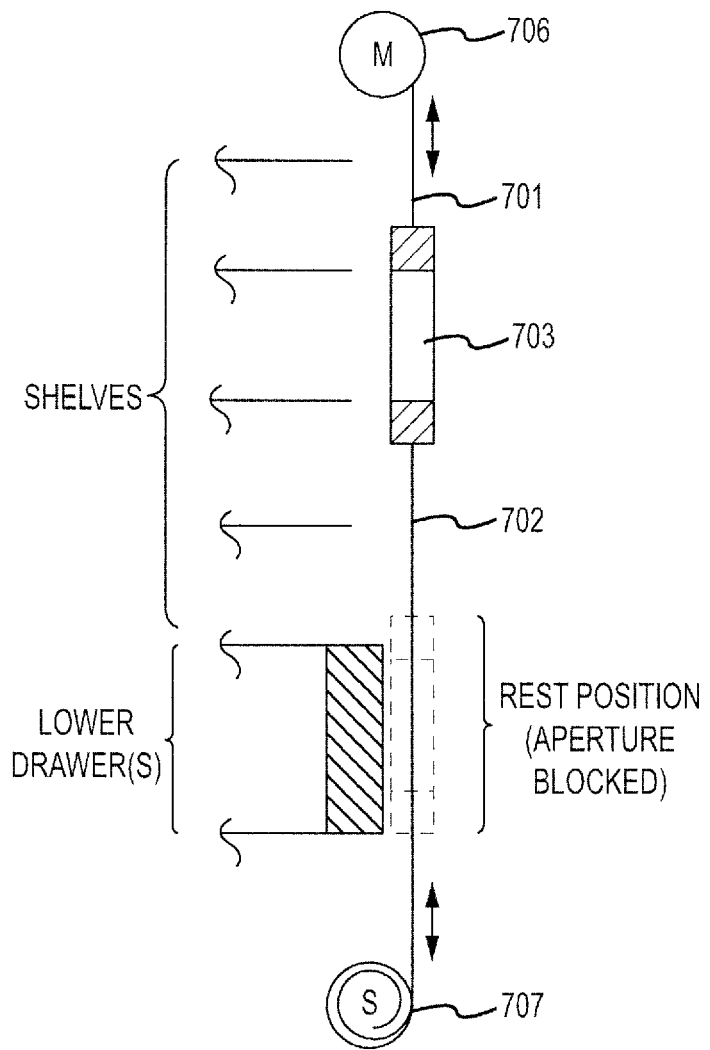

In one embodiment, the access member 250 may comprise a shutter 700 as depicted in FIGS. 7A and 7B. The shutter 700 may include a first screen 701 and a second screen 702. The first screen 701 and the second screen 702 may define an aperture 703 therebetween. The first screen 701 and the second screen 702 may both move relative to a first parallel guide 704 and a second parallel guide 705. The first screen 701 may define a surface between the first parallel guide 704 and the second parallel guide 705 extending away from the aperture 703, with the first screen terminating in a first roller device 706, wherein an excess length of first screen 701 may be collected on the first roller device 706. The second screen 702 also may define a surface between the first parallel guide 704 and the second parallel guide 705 extending away from the aperture 703 in a direction opposite the direction in which the first screen 701 extended. The second screen 702 may terminate in a second roller device 707, such that excess lengths of the second screen 702 is collected around the second roller device 707. The first roller device 706 and/or the second roller device 707 may be powered by a motor(s) M, actuators, or the like and may be controlled by a controller (not shown). Further, in the illustrated embodiment the second roller device 707 may include a coil spring S to facilitate screen positioning by providing a screen-pull bias toward the second roller device 707.

The first screen 701 and the second screen 702 may be controlled to move along the first parallel guide 704 and the second parallel guide 705 by rotating the first roller device 706 to move the first screen 701 and the second roller device 707 to control the second screen 702. By controlling the rotation of the first roller device 706 and the second roller device 707 in conjunction, the aperture 703 may be positioned along the extent of the first parallel guide 704 and the second parallel guide 705 by varying the amount of the first screen 701 and the second screen 702 unrolled from the first roller device 706 and the second roller device 707. In this manner, aperture 703 may be selectively located adjacent to a given storage location 221. In one embodiment, the aperture 703 may be positionable in a rest position (e.g. when no storage locations 221 are being accessed), wherein the aperture is blocked by a blocking member as shown in FIG. 7B. Also, in one embodiment, the first screen 701 and the second screen 702 may be controlled such that the first screen 701 and the second screen 702 are brought into contact such that the aperture 703 is completely closed.

Figure 4:
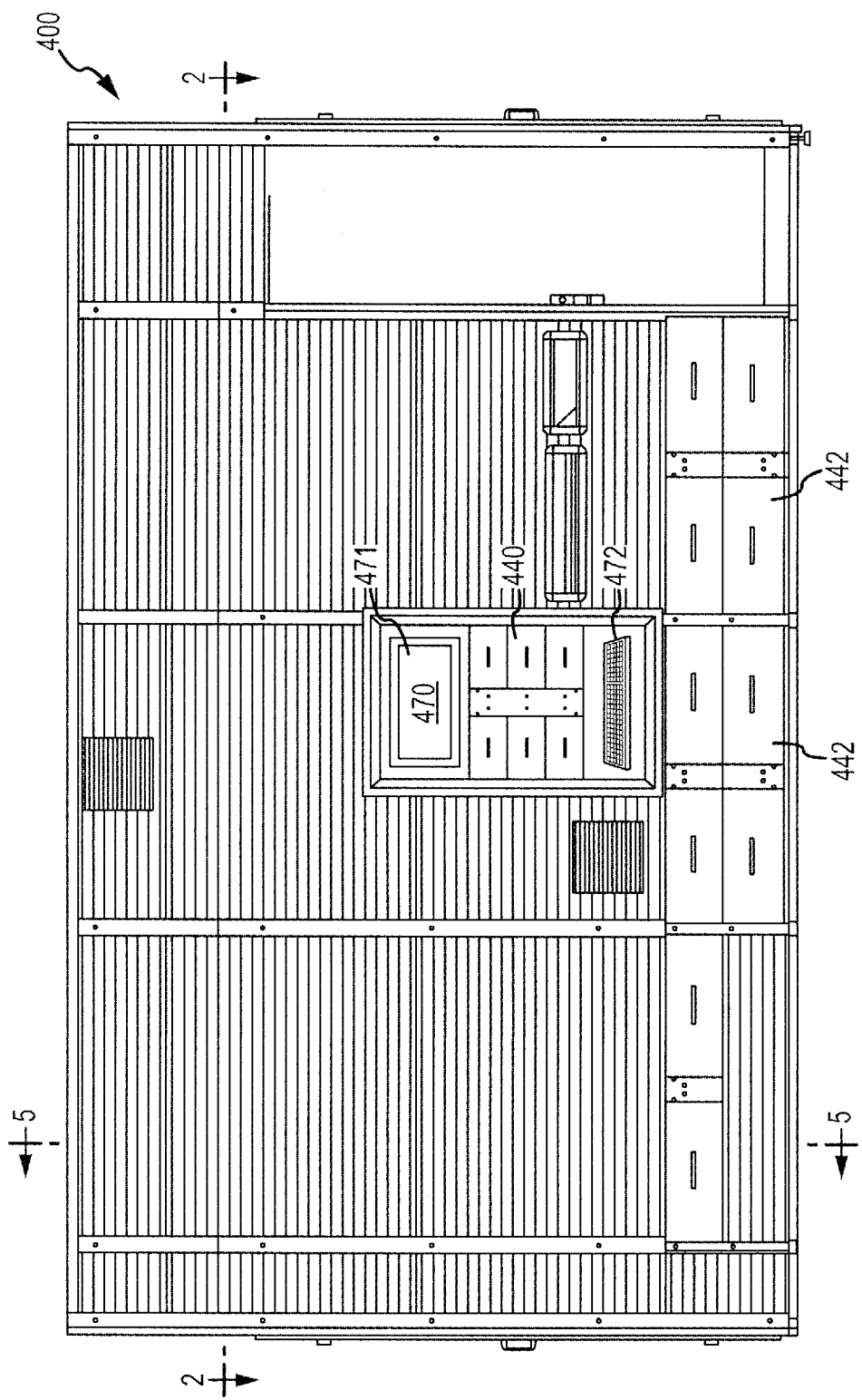
FIG. 4 is a front elevation view of one implementation of the storage and retrieval system embodiment of FIG. 2.

FIG. 4 depicts a front elevation view of one embodiment of the automated storage and retrieval system 200. Multiple access ports 440 may be arranged on the front of the automated storage and retrieval system 200. The multiple access ports 440 may be selectively accessible from the exterior of the enclosed area 201 such that items may be communicated from the exterior of the enclosed area 201 to each of the multiple access ports 440 and vice versa. In addition, each of the multiple access ports 440 may communicate with the automated transport member 230 such that an item may be placed in or retrieved from the access port 440 by the automated transport member 230. The access ports 440 may include an access-limiting device such that access to the access ports 440 is controllably limited. This may entail a lock or other device, wherein the access port 440 may not be opened or may have limited communication with the exterior of the enclosed area 201. Accordingly, a controller (not shown) may control the access-limiting device such that access may be provided to the access ports 140 after one or more conditions have been met. Also, the access ports 140 may be mechanized such that an open access port 140 (e.g., one a user has accessed, but failed to close) may be automatically closed.

In one implementation, multiple drawers 442 may also be included for storing items in system 400, wherein such drawers 442 are accessible from the exterior of system 400. Such drawers 442 may be provided without being accessible by, or in communication with, the automated transport member 230. As shown, in FIG. 4 one or more maintenance doors 472, 474 may also be provided to access the interior of system 400. For example, a first lockable maintenance door 472 may access the interior item storage locations and automated transport member 230, while a second lockable maintenance door 474 may access a thermal control unit 280 for servicing.

Additionally, a user interface 470 may be located in the front of automated storage and retrieval system 400. This user interface 470 may consist of a monitor 471 as well as an input device 472. This input device may comprise a keyboard, and mouse, a touch screen, or any other input device known in the art.

Figure 5:
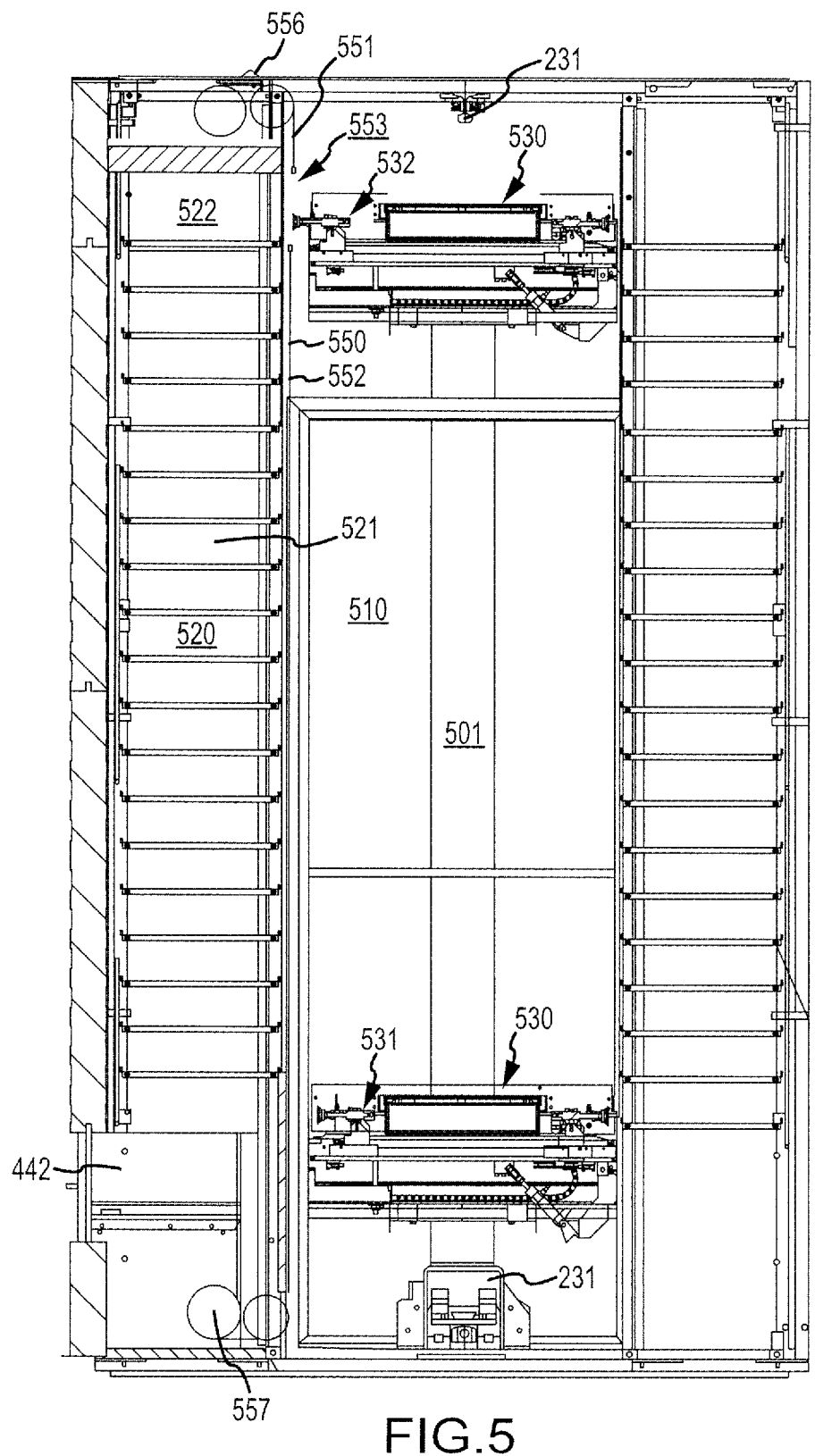
FIG. 5 is a section view taken along section line 5-5 of FIG. 4 and shows an automated transport member embodiment in first and second positions.
Figure 6:
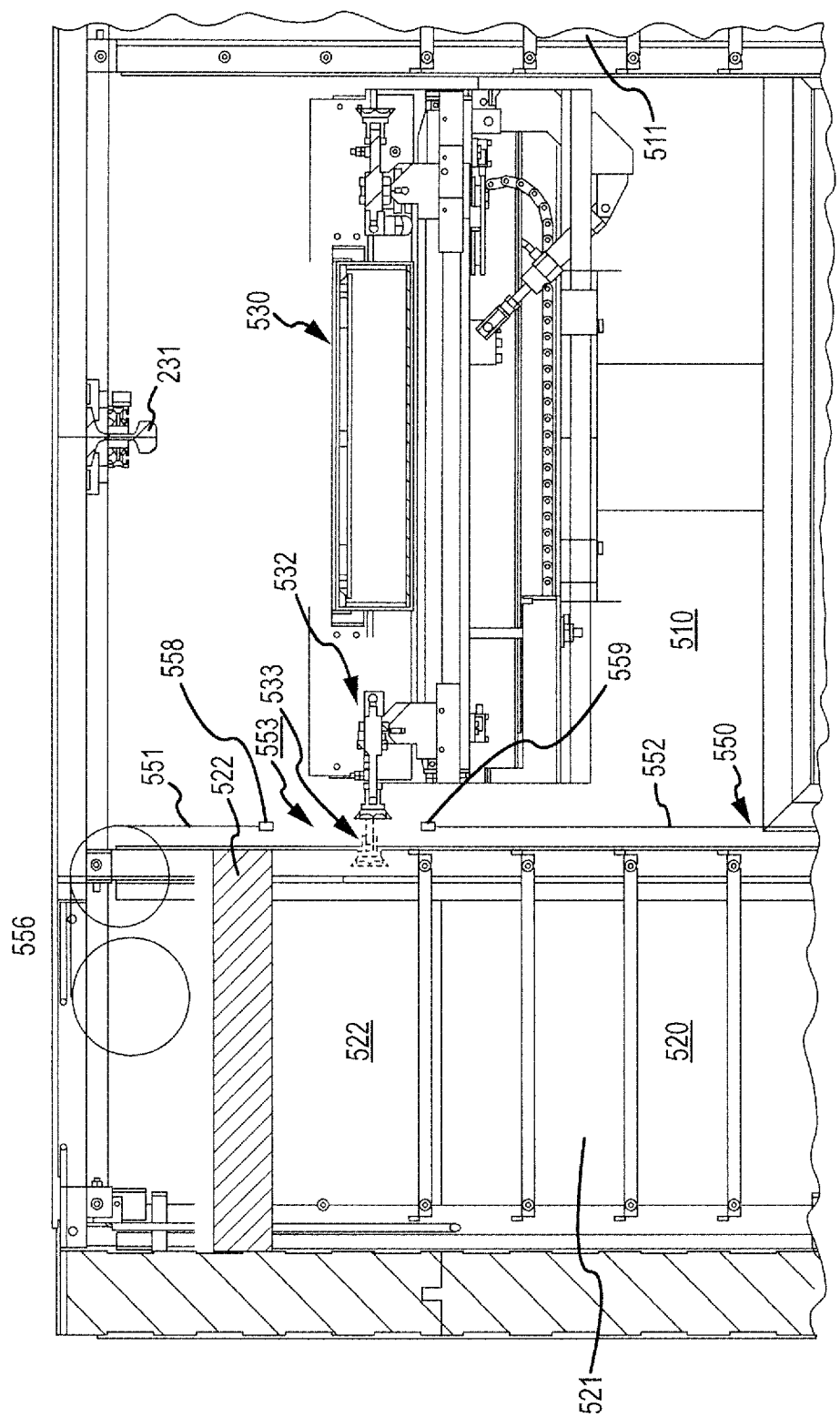
FIG. 6 is an enlarged view of a selected portion of FIG. 5, illustrating the automated transport member embodiment of FIG. 5 in second and third positions.

FIG. 5 is a section view taken from section line 5-5 of FIG. 4. FIG. 5 shows the automated transport member 530 in a first position 531 and a second position 532. FIG. 6 is a detailed view of the automated transport member 530 in the second position 532. Additionally depicted in FIGS. 5 and 6 is the access member 550 which may assist thermally isolating the storage locations 521 in the second zone 520 and the first zone 510. The storage locations 521 in the second zone 520 may be accessible by the automated transport member 530 upon proper orientation of the access member 550. The access member 550 in FIGS. 5 and 6 may consist of a shutter 553, substantially similar as the shutter 703 depicted in FIG. 7 and described above. In the embodiment depicted in FIGS. 5 and 6, the access member 550 may also define an aperture 553 that may be capable of being positioned by controlling the access member 550 such that the first roller device 556 and the second roller device 557 are operated in conjunction to position the aperture 553. As such, the aperture may be positioned by manipulating the amount of the first screen 551 and second screen 552 spooled on either the first roller device 556 or the second roller device 557. For instance, in order to gain access to storage bin 522, the first roller device 556 may be actuated such that the first screen 551 of the access member 550 may be in a position as shown in FIG. 6, wherein a first edge member 558 may be at or above the upper margin of the storage bin 522. Additionally, the second roller device 557 may be actuated such that the second screen 552 of the access member 550 may be in a position as shown in FIG. 6, wherein a second edge member 559 may be at or below the lower margin of the storage bin 522. Accordingly, the first screen 551 and the second screen 552 may form an aperture 553 wherein the automated transport member 530 may access the storage bin 552 in the second zone 520. In order to access the second zone 520, the automated transport member 530 may move from the second position 532 to a third position 533 (i.e. shown with phantom lines in FIG. 6) in a second dimension as mentioned previously. Moreover, the automated transport member 530 may move in a third dimension to access other storage locations 521. In order to access storage locations in a third dimension (e.g. in order to access different rows of storage locations) the automated transport member 530 may be operated in conjunction with the access member 550 to position the aperture 553 in the third dimension to accommodate access to the desired storage location 521 located in the third dimension. In other words, in one embodiment both the aperture 553 and the automated transport member 530 may both be operated such that each move to access different rows of storage locations. In such a case, the aperture 553 as well as the access member 550 may be of substantially similar length to a module length such that the aperture 553 grants access to an entire row of storage locations 521. Alternatively, the access member 550 may be controlled in the first dimension (e.g. providing access to different columns of storage locations), such that the aperture moves in the third dimension to expose different columns of storage locations 521. In yet another embodiment, an access member 550 may be moved in the first and third dimension, such that a specific storage location 521 corresponding to a particular row and a particular column may be the only storage location 521 exposed by the access member 550.

In one embodiment, as shown in FIG. 2, a thermal control unit 280 may be in operative communication with the second zone 220. As depicted in FIG. 2, the thermal control unit 280 may be located within the enclosed area and may be operative to communicate with the second zone 220. The thermal control unit as depicted in FIG. 2 may also be controlled via the controller (not shown in FIG. 2) in order to maintain temperature in the second zone 220 different from that in the first zone 210. This offset temperature may be lower such that items that need to be chilled or refrigerated may be stored in the second zone 220 as opposed to the first zone 210. The thermal control unit 280 may include a refrigerating unit or other means known in the art for cooling. In an additional embodiment, the thermal control unit 280 may provide heating to the second zone 220 such that the thermal control unit 280 may maintain a higher temperature in the second zone 220 than the temperature in the first zone 210.

In operation, the automated storage and retrieval system 200 may be manipulated by the user in order to either store or retrieve a plurality of items, some of which necessitate storage at a temperature different from other items. In order to accomplish this, the user may enter data by way of the user interface 470. This data may include information pertaining to the item, the storage location of the item, or the need to keep the item at a desperate temperature. Once the user has entered this information, the controller (not shown) may then process the information and may determine which access port 440 into which the user may deposit the item. In addition, the controller (not shown) may further control the access-limiting device to provide access to the selected access port 440. Once determined, the user may deposit the item into that specified access port which the controller (not shown) may provide access.

The controller may control motors 235 or other actuators associated with the automated transport member 230 such that the automated transport member 230 may be positioned adjacent to the access port 440 in which the user has deposited the item. The automated transfer member 230 may retrieve the item from the access port 440. The controller (not shown), based at least partially on the information entered by the user, may control the automated transport member 230 to transport the item to a designated storage location. In the instance that the item does not require storage at a temperature different from the temperature in the first zone 210, the automated transport member 230 may deposit the item in a specified storage location 211 in the first zone 210.

However, the item to be stored may require storage at a temperature offset from that in the first zone 510. In that case, the controller (not shown) may control the automated transport member 530 such that the automated transfer member 530 may be positioned adjacent to a storage location 522 in the second zone 520. Additionally, the controller (not shown) may control the access member 550, which may include controlling the operation of the first roller device 556 and the second roller device 557, to locate the aperture 553 adjacent to the automated transport member 530 and the specified storage bin 522 in the second zone 520. The access member 550 may temporarily interrupt the thermal isolation of the second zone 520 from the first zone 510. As such that the automated transport member 530 may move from a second position 532 in the first zone to a third position 533, where the automated transport members may be at least partially located in the second zone 520. In the automated transport member 530 may then retrieve an item in the exposed storage location in the second zone 520, removing the item from the second zone 520 via the aperture 553 in the access member 550. The access member 550 may then be manipulated such that thermal isolation of the second zone 520 from the first zone 510 is once again established. This may be accomplished by positioning the aperture 553 such that the aperture 553 is not located adjacent to the second zone. One way of accomplishing this may be to provide excess space between the first roller device 556 or second roller device 557 and the insulation 222 or other thermal isolation means thermally isolating the second zone 520 from the first zone 510. As such, the aperture 553 may be positioned such that the aperture 553 is located adjacent to the excess space between the second zone 520 and the first roller device 556 or second roller device 557, and does not expose any of the second zone 520. Optionally, the excess space may include a blocking member to effectively close the aperture 553. In short, the first screen 551 alone may limit access to the second zone 520 or the second screen 552 alone may limit access to the second zone 522. Alternatively, the access member 550 may be controlled such that the first roller device 556 and the second roller device 557 may be operated such that the first screen 551 comes into close proximity with the second screen 552 as to close the aperture 553. As such, the first screen 551 and the second screen 552 may form a substantially continuous partition between the first zone 510 and the second zone 520. In this configuration, the aperture 553 may not need to be moved away from the second zone 520. The aperture 553 may close in the position that it was in during the removal of the item from the second zone 520.

Figure 8:
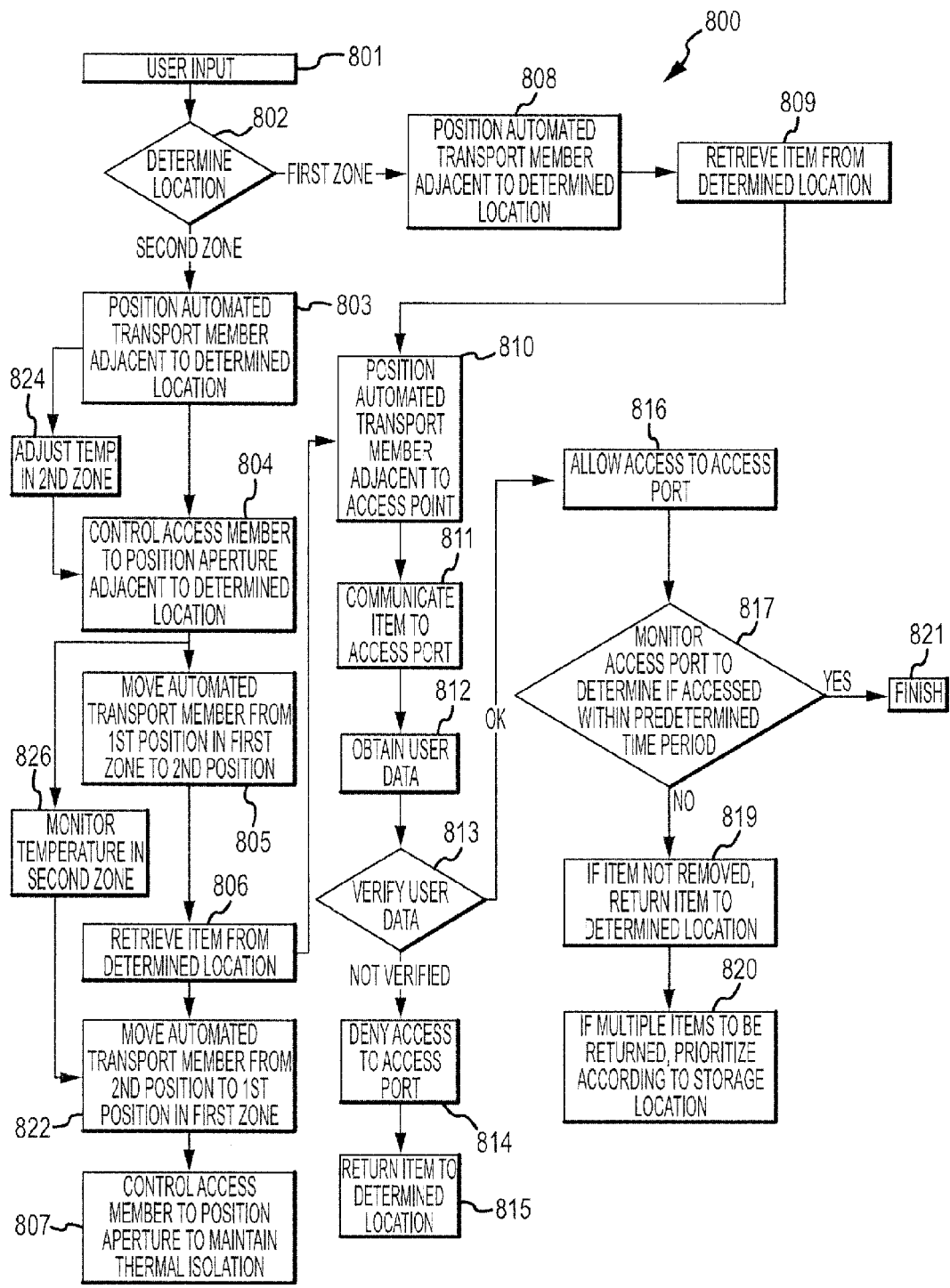
FIG. 8 illustrates a retrieval process according to one embodiment.

Turning to FIG. 8, a retrieval process 800 according to one embodiment is depicted in a flow chart. Generally, the process may begin at 801 wherein a user may enter data, possibly via a user interface 170, 470, pertaining to an item, the user, or any other data required to properly determine a storage location, access rights, or the like. At 802, the controller may establish a Determined Location, wherein the item to be retrieved is stored. It may be the case that more than one location within the storage system contains the same or similar items. In this regard, the items may be retrieved from these various locations according to a pre-established system. For instance the pre-established system may use inventory management techniques (e.g., first-in first-out, etc.). An example of such a system uses the lot numbers or expiration dates of the similar items in different locations. For instance, an item that fulfils the request may have an expiration date earlier than another item that also fills the order. In this case, the item that expires first may be retrieved first. Alternatively, the system may monitor which of the similar items have been retrieved and determine which should be retrieved such that each similar item is used at about the same rate.

Following the flowchart to 808, if the item to be stored is to be stored in the first zone 110, 210, 510 the controller may position the automated transport member 130, 230, 530 adjacent to the Determined Location. The automated transport member 130, 230, 530 may then retrieve the item from the Determined Location at 809.

Alternatively, in the event the item to be retrieved is in the second zone 120, 220, 520, the process may proceed from 802 to 803, wherein the automated transport member 130, 230, 530 may be positioned adjacent to the Determined Location in the second zone. Additionally, at 824, the temperature in the second zone 120 may be adjusted to compensate for the anticipated disruption of thermal isolation. Also, at 804 the access member 150, 250, 550 may be controlled such that the aperture 553 is positioned adjacent to the Determined Location. Once thermal isolation is disturbed between the two zones by way of moving the access member 150, 250, 550, the temperature in the zone may be monitored at 826 and compared to a predetermined allowable temperature range. In the event the temperature within the second zone deviates from the predetermined allowable temperature range during the retrieving operation, the process may proceed to 822, where the retrieving operation may be terminated and the access member 150, 250, 550 may be controlled to reestablish thermal isolation of the second zone 120, 220, 520.

At 805, the automated transport member 130, 230, 530 may be moved from a first position in the first zone to a second position such that at 806 the automated transport member 130, 230, 330 may retrieve the item stored within the Determined Location within the second zone 120, 220, 520. Then at 822, the automated transport member may be moved from a second position in the second zone 120, 220, 520 to a first position in the first zone 110, 210, 510. At 807, the access member 150, 250, 550 may controlled to re-establish thermal isolation between the second zone 120, 220, 520 and the first zone 110, 210, 510.

Regardless of whether the process proceeds according to the steps following 808 or the steps following 803, the process may proceed to 810 wherein the automated transport member 130, 230, 530 may be positioned adjacent to an access port possibly determined by a controller. At 811 the automated transport member 130, 230, 530 may communicate the item to the access port to which it is adjacent. At 812, user data may be gathered to determine if access should be provided as per 813 to the item now in the access port. At 813, the data gathered may be verified. In the event that the data is not verified, access to the access port may be denied at 814 and at 815 the item may be returned to the Determined Location following a storage process 900 to be detailed further below.

Alternatively, if the data gathered at step 813 is valid, the process may proceed to 816 wherein access to the access port may be granted by a controller. This access may be accomplished by unlocking the access port or otherwise controlling an access-limiting device to allow access. In one embodiment, the process may proceed to 817 wherein a controller may monitor the access port to determine if the access port is accessed by a user within a predetermined time period. If, after the predetermined time period the port is not accessed, the item may be returned at 819 according to a storage process 900 to be detailed below. More generally, for items retrieved from the second zone (e.g., items that require storage in a specified temperature range), the controller may monitor the time the items have been outside the second zone. In the event the items are exterior to the second zone for a period in excess of an allowable period, the controller may be operative to return the items to the second zone.

In this regard, it may be that multiple items are stored together in a single storage bin that have different allowable period for which they may be outside the second zone. Accordingly, the shortest allowable period may dictate the allowable period for all times in the bin. That is, for a plurality of items in a storage bin, the allowable period for the bin may be set to the allowable period of the item having the shortest allowable period outside the temperature controlled zone.

It may also be the case that items outside of the second zone are located in an access port. In this case, the ability to return the item may depend on the status of the access port. For instance, in the case that an item that has exceeded the allowable period outside the temperature controlled zone is located in a closed and locked access port, the item may simply be returned to a storage location in the temperature controlled zone. However, if an item that has exceeded the allowable period outside the temperature controlled zone is located in a closed, but unlocked access port, the access port may be locked and the item may be returned.

Further still, the item that has exceeded the allowable period outside the second zone may be in an unlocked and open access port. As such, the item may not be able to be returned without the closing and locking of the access port. Accordingly, an auditory and visual alarm may be provided to alert a user of the situation and may further direct the user to close the access port to allow the item to be returned. Alternatively, there may be provided a mechanism for automatically closing the access port such that it may be locked and returned. This mechanism may comprise a motorized drawer capable of closing and securing the access port without relying on a user to close the access port. In any instance where the item must be returned due to the item being outside the temperature controlled zone for than the allowable period, if the request for which the item was outside the zone has not been completed (e.g., the user has yet to access the access port in which the item is located), the request may be saved such that the request may be completed at a later time.

Furthermore, each storage operation may take some amount of time such that if a multitude of items need to be returned due to exceeding the allowable period, it may be some time before the last item is stored. As such, the number of items that have been retrieved from the temperature controlled zone may be limited. In this regard, the number of items belonging in the temperature controlled zone that are outside the temperature controlled zone (e.g., on the automated transport member or in an access port) may be limited to allow the safe return of the items in a timely fashion.

Further still, the items must have an available location to be returned to within the temperature controlled zone. There exists a potential that, by way of items being retrieved and stored, the bins within the temperature controlled zones may become full, preventing the automatic storage of items whose exposure time requires re-storage. As such, in one embodiment, there may always be one or more bins dedicated to receiving such a re-storage request.

In one embodiment wherein an automated storage and retrieval system includes a plurality of access ports such that items have been retrieved and communicated into more than one access port, at 820 a controller may compare the identity of the items not removed from the access ports and may determine a priority according to which the items may be returned. In one embodiment, items retrieved from the second zone may receive a higher priority (e.g. that is to say these items may be returned before items retrieved from the first zone) for storage. Moreover, should multiple items retrieved from the second zone not be removed, these items may also receive varying priorities depending on a variety of factors including, but not limited to, the identity of the item, the identity of the user, the amount of time the item has been out of the second zone, or other pertinent factors. In any event, each item may be returned according to a storage process 900 as detailed below. Finally, in the event that all items are removed from the access ports, the process may finish at 821.

Figure 9:
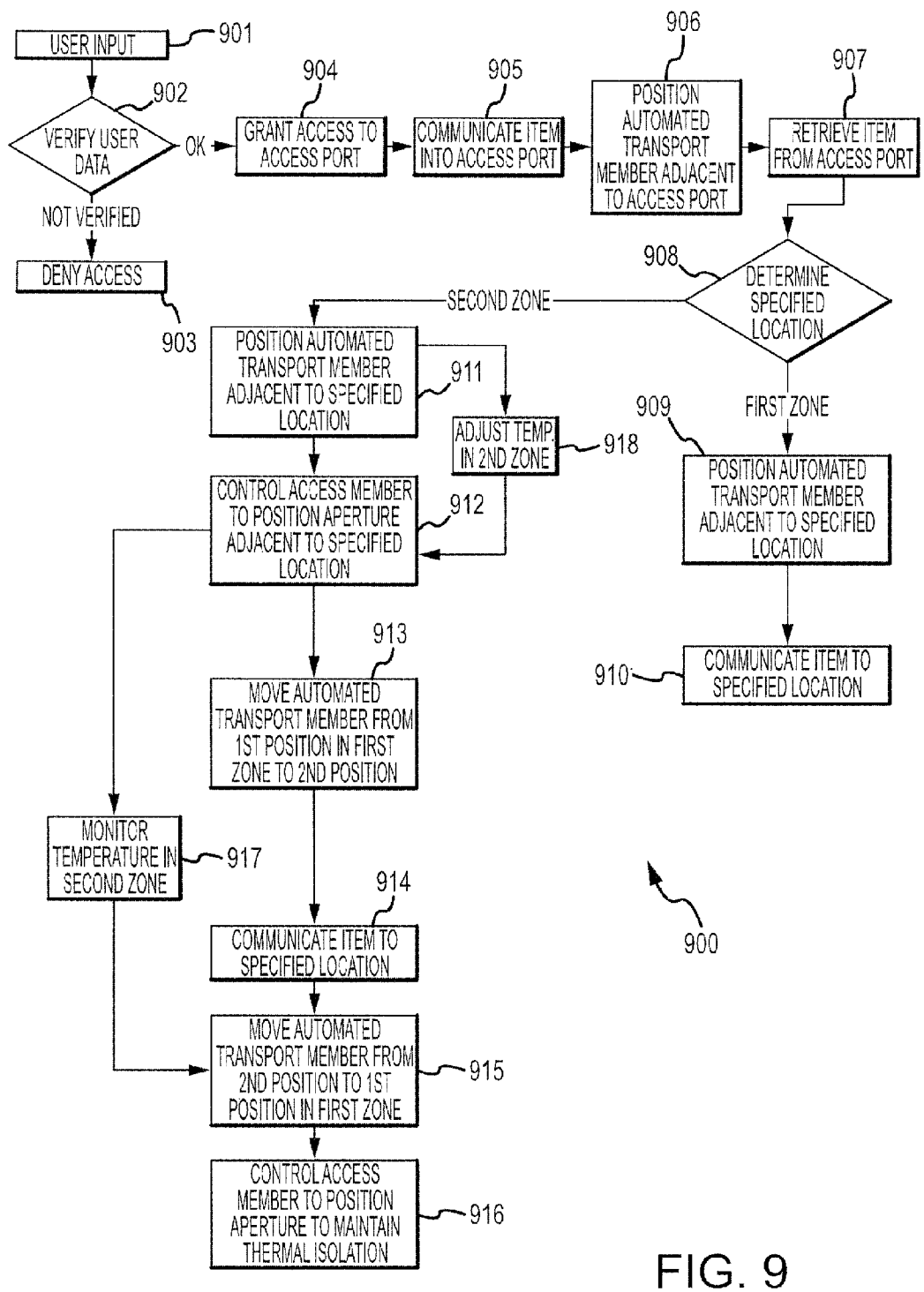
FIG. 9 depicts a storage process in accordance with one embodiment.

FIG. 9 depicts a storage process 900 in accordance with an embodiment of the automated storage and retrieval system. The storage process 900 may begin at 901 with a user entering data. This data may be entered using a user interface 170, 470. The data entered at 901 may include, inter alia, data regarding the user, an item, or other data associated with the storage process. At 902, a controller may verify user data to determine if access to the automated storage and retrieval system may be granted. In the event the data is not verified, the process may proceed to 903 where it may be terminated. Alternatively, the storage process may initiate after an item to be stored in the temperature controlled zone has exceeded the allowable period outside the temperature controlled zone.

However, in the event the data is verified at 902, the process may proceed to 904 where access to an access port may be granted. Access to the access port may be such that a user, device, or other means may communicate the item to be stored to the access port at 905. At 906, the automated transport member may be positioned adjacent to the access port in which the item has been communicated. At 907, the automated transport member may retrieve the item from the access port.

At 908, a controller may determine if the item retrieved from the access port is to be stored in the first zone or the second zone. In the event the item is to be stored in the first zone the process may proceed to 909 wherein the automated transport member may be positioned adjacent to the Specified Location that is determined at 908. At 910 the item may then be communicated to the Specified Location at 910.

Alternatively, if the item retrieved from the access port at 907 is to be stored at a Specified Location within the second zone, the process may proceed to 911 such that the automated transport member may be positioned adjacent to the Specified Location. Additionally, the temperature in the second zone may be adjusted at 918 in anticipation of the disruption of thermal isolation of the second zone. At 912 the access member may be controlled such that the aperture may be positioned adjacent to the Specified Location. At 917 the temperature in the second zone may be monitored and compared against a predetermined allowable temperature range. If the temperature in the second zone deviates from the allowable temperature range, the storage operation may be terminated and the process may proceed to 915 where thermal isolation is reestablished. If the temperature is maintained in the allowable temperature range, the process may proceed to 913 and the automated transport member may be moved from a first position in the first zone to a second position. At 914 the automated transport member may retrieve an item from the Specified Location. Further, at 915, the automated transport member may move from the second position to a first position in the first zone. Finally, at 916, the access member may be controlled such that thermal isolation between the first zone and second zone is reestablished. Additionally, the temperature within the second zone may be monitored during the operation and compared to a predetermined range of acceptable temperatures. In the event the temperature within the second zone deviates from the acceptable range of temperatures, the operation may be terminated and thermal isolation reestablished.

What is claimed is:

1. An automated storage and retrieval system, comprising:
an enclosed area including a first zone having a first plurality of storage locations and a second zone having a second plurality of storage locations, wherein said second zone is thermally isolated from said first zone;
an automated transport member operable to selectively transport an item between said first plurality of storage locations and at least one predetermined area in said enclosed area comprising an access port for accessing items from outside said enclosed area and said automated transport member is operable to selectively transport an item between said second plurality of storage locations and at least one predetermined area in said enclosed area comprising an access port for accessing items from outside said enclosed area;

a controller operable to receive a plurality of user commands corresponding to a plurality of user specified items located in said first zone and said second zone, wherein said controller is operable to correspond to a user specified item and determine a location corresponding to each of said plurality of user specified items, wherein said controller is operable to control the position of said automated transport member such that said automated transport member is positioned adjacent to each said location, to control said automated transport member to retrieve each of said plurality of user specified items, and to control said automated transport member to transport each of said user specified items to said access port, wherein said controller defines a priority for said plurality of user commands at least partially based on each said user specified items corresponding to each of said plurality of user commands and controls said automated transport member to retrieve said plurality of user specified items according to said prioritizing and transport said plurality of user specified items according to said priority; and an input device responsive to a user and operative to communicate with said controller.

2. The automated storage and retrieval system of claim 1, further comprising:
a thermal control unit operable to maintain a first temperature in at least said second zone offset from a second temperature in said first zone.

3. The automated storage and retrieval system of claim 1, wherein said access port has a first access port opening in operative communication with said automated transport member and a second access port opening in communication with an environment exterior to said enclosed area.

4. The automated storage and retrieval system of claim 3, wherein said access port includes a plurality of access ports.

5. The automated storage and retrieval system of claim 1, wherein said controller is operable to control said automated transport member to return at least one of said plurality of user specified items from the at least one predetermined area comprising said access port to said second zone after a predetermined interval of time.

6. The automated storage and retrieval system of claim 5, wherein said controller is operable to define an order to said plurality of user specified items and return said plurality of user specified items to said first zone and said second zone according to said ordering.

7. An automated storage and retrieval system, comprising:
an enclosed area including a first zone having a first plurality of storage locations and a second zone having a second plurality of storage locations, wherein said second zone is thermally isolated from said first zone by insulation surrounding said second zone;
an automated transport member operable to selectively transport an item between one of said first plurality of locations and said second plurality of locations and a predetermined position in said enclosed area comprising an access port for accessing items from outside said enclosed area; and
an access member at said insulation between said first zone and said second zone that defines an aperture through said insulation that is positionable adjacent to said second plurality of locations, said access member providing said automated transport member selective access to said second plurality of storage locations through said aperture.

8. The automated storage and retrieval system of claim 7, comprising:

a thermal control unit in operative communication with at least one of said first zone and said second zone.

9. The automated storage and retrieval system of claim 8, wherein said thermal control unit is in operative communication with said second zone to maintain a first temperature in said second zone offset from a second temperature in said first zone.

10. The automated storage and retrieval system of claim 7, wherein said aperture is controllable in a first direction and a second direction, wherein said second direction is opposite to said first direction.

11. The automated storage and retrieval system of claim 9, comprising:
a controller configured to receive a user command corresponding a user specified item, determine a first location corresponding to said user specified item, control said automated transport member such that said automated transport member is positioned adjacent to said first location, control said access member to provide said automated transport member with access to said second zone, control said automated transport member to retrieve said user specified item, and control said automated transport member to transport said user specified item to a second location.

12. An automated storage and retrieval system, comprising:
an enclosed area including a first zone having a first plurality of storage locations and a second zone having a second plurality of storage locations, wherein said second zone is thermally isolated from said first zone by insulation surrounding said second zone;
an automated transport member operable to transport a first item between said first zone and a predetermined area in said enclosed area comprising an access port for accessing items from outside said enclosed area and said automated transport member is operable to transport a second item between said second zone and said predetermined area comprising an access port for accessing items from outside said enclosed area; and
an access member defining an interface in said insulation surrounding said second zone such that said access member provides selective access for communication between said first zone and said second zone through an aperture defined by said access member;
wherein said automated transport member is operable to travel in at least a first dimension and is operable to travel in a second dimension through said aperture from a first position in said first zone to a second position in said second zone;
wherein said access member is controllable in at least said first dimension to enable said automated transport member to access said second zone.

13. The automated storage and retrieval system of claim 12, wherein said enclosed area is defined by a plurality of modules interconnected in an end to end fashion and extend in at least said first dimension, said plurality of modules each having a module length.

14. The automated storage and retrieval system of claim 12, wherein said automated transport member is operable to travel in a third dimension, wherein at least one of said first plurality of storage locations and said second plurality of storage locations extend in said third dimension.

15. The automated storage and retrieval system of claim 14, wherein said access member is controllable in said first dimension and said third dimension.

16. The automated storage and retrieval system of claim 12, wherein said automated transport member is supported by at least a primary support member extending in said first dimension.

17. The automated storage and retrieval system of claim 16, wherein said primary support member comprises a plurality of support segments each having a support segment length substantially equal to said module length, wherein said plurality of support segments are interconnected in an end to end fashion extending in at least said first dimension and are modularly expandable in said first dimension.

* * * * *